(No Model.)
T. S. WOODRUFF.
WIRE FASTENER.
No. 244,410. Patented July 19, 1881.
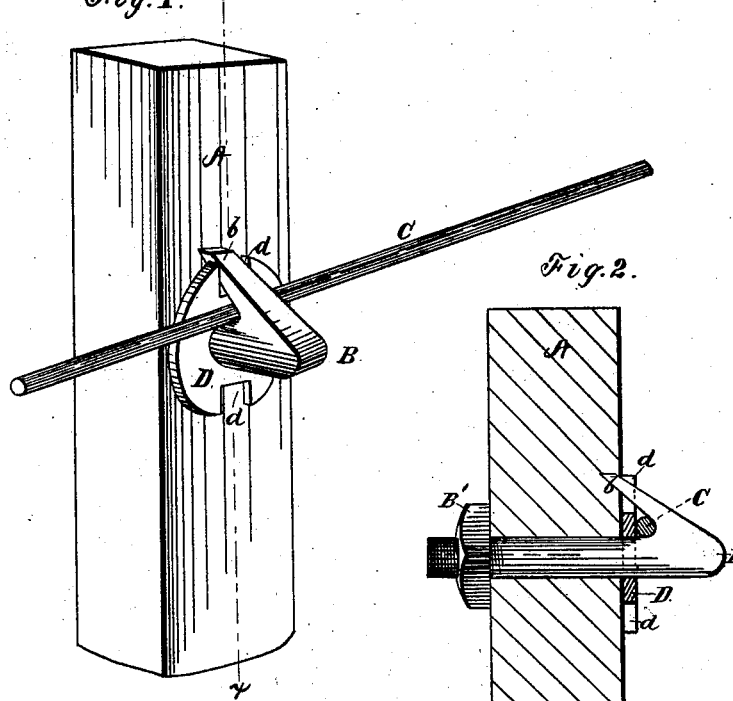
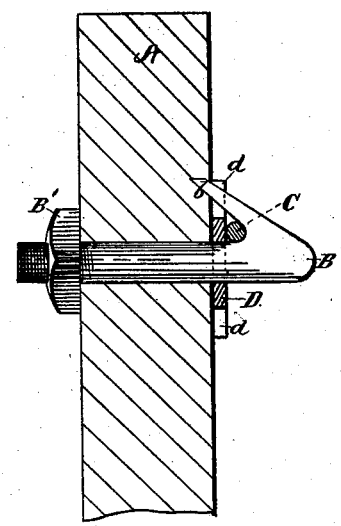
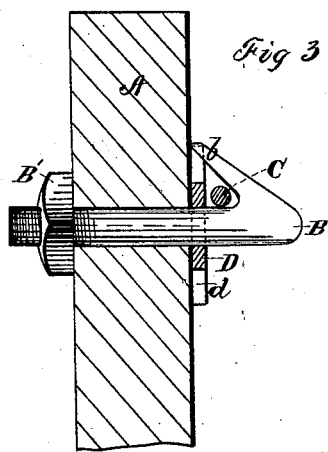
Witnesses.
W. R. Edilen.
Jno K Hallock
Inventor
Thos. S. Woodruff

UNITED STATES PATENT OFFICE.

THOMAS S. WOODRUFF, OF ERIE, PENNSYLVANIA.

WIRE-FASTENER.

SPECIFICATION forming part of Letters Patent No. 244,410, dated July 19, 1881.

Application filed May 28, 1881. (No model.)

*To all whom it may concern:*

Be it known that I, THOMAS S. WOODRUFF, of Erie, Erie county, Pennsylvania, have invented a new and useful Improvement in Devices for Attaching Fence-Wire to Posts; and I do hereby declare that the following is a full, clear, and exact description thereof, reference being had to the accompanying drawings and the letters or figures of reference marked thereon.

My invention relates to devices for attaching fence-wire to posts.

The object of my invention is to provide a fastening device for the wires of wire fences which will gripe the wire firmly, and which, if from any cause it should become loosened so as to permit lateral movement of the wire, will hold it sufficiently to prevent it becoming detached from the post.

My device is shown in the accompanying drawings as follows:

Figure 1 is a perspective view, showing my device in use upon a post. Fig. 2 is a vertical section on the line $x\,x$, Fig. 1. Fig. 3 is a like view to Fig. 2, showing the bolt loosened.

A is the post; B, the wire-attaching bolt; B', the nut on the bolt; C, the wire; D, the washer, forming a metallic bearing against the post; $d\,d$, slots in the washer D; $b$, the hook on the bolt.

The wire is held to the post by being griped between the hook $b$ on the bolt B and the washer D when the nut B' is sufficiently screwed up. The hook $b$ on the bolt B sets back on an angle, or on a curve, if desired, and when the wire is griped it overreaches the wire and enters a slot, $d$, in the washer, and if it is as long as is shown in Figs. 2 and 3 it will enter the post a little. If, now, from any cause the bolt becomes loosened—as, for instance by the shrinking of the wood of the post, or by the loosening of the nut B', or by the expansion of the bolt B by the action of heat—the wire will be loosened so that it can move lengthwise; but the hook $b$ will prevent it becoming disengaged, for it cannot pass the point of the hook until the bolt is loosened so far as to bring the hook point far enough beyond the washer to allow the wire to pass—a contingency which will not occur except when the nut B' is purposely unscrewed, certainly not by the action of the causes above named.

The washer D may have one slot only, or two, as shown, or as many more as desired; or a small washer, which will pass under the point of the hook, may be used.

The essential feature of my invention is that the point of the hook shall reach back over the wire and its bearing on the post sufficiently to prevent the wire becoming disengaged when the bolt, from any cause becomes sufficiently loosened to allow the wire to move lengthwise.

My device will be found very convenient in taking up the slack which occurs in the wires after use, as by it the fastenings can be slightly loosened and the wire drawn taut without it leaving the fastening.

What I claim as new is—

A fence-wire fastening consisting of a bolt the head of which is hooked back far enough to reach over the wire and its bearing, in combination with a washer forming said bearing, which is provided with a slot for the passage of the point of said hook.

In testimony that I claim the foregoing, I have hereunto set my hand this 25th day of May, 1881.

THOMAS S. WOODRUFF.

Witnesses:
JNO. K. HALLOCK,
W. R. EDELEN.